United States Patent
Hamzeh

(10) Patent No.: US 8,369,828 B2
(45) Date of Patent: Feb. 5, 2013

(54) MOBILE-TO-MOBILE PAYMENT SYSTEM AND METHOD

(75) Inventor: Mehrak Hamzeh, Encinitas, CA (US)

(73) Assignee: Globaltel Media, Inc., San Diego, CA (US)

( * ) Notice: Subject to any disclaimer, the term of this patent is extended or adjusted under 35 U.S.C. 154(b) by 729 days.

(21) Appl. No.: 11/940,288

(22) Filed: Nov. 14, 2007

(65) Prior Publication Data

US 2008/0133403 A1    Jun. 5, 2008

Related U.S. Application Data

(60) Provisional application No. 60/859,143, filed on Nov. 14, 2006.

(51) Int. Cl.
*H04M 11/00* (2006.01)
*H04M 15/00* (2006.01)
*H04W 4/00* (2009.01)
*G07F 19/00* (2006.01)
*G06Q 40/00* (2012.01)

(52) U.S. Cl. ........ 455/406; 455/403; 455/408; 455/466; 705/34; 705/39; 705/40; 379/114.03; 379/115.01

(58) Field of Classification Search .................. 455/406, 455/466, 403, 408; 379/114.03, 114.19, 379/114.28, 115.01; 705/34, 39, 40
See application file for complete search history.

(56) References Cited

U.S. PATENT DOCUMENTS

| 2003/0125054 A1* | 7/2003 | Garcia ........................... 455/466 |
| 2003/0140004 A1* | 7/2003 | O'Leary et al. .................. 705/39 |
| 2004/0002350 A1* | 1/2004 | Gopinath et al. ............. 455/466 |
| 2006/0015437 A1* | 1/2006 | Kulasooriya et al. ........... 705/37 |
| 2006/0265325 A1* | 11/2006 | Fajardo ........................... 705/40 |

FOREIGN PATENT DOCUMENTS

| GB | 2 372 615 A | 8/2002 |
| WO | WO 98/42173 A | 10/1998 |
| WO | WO 00/60845 A | 10/2000 |
| WO | WO 02/45037 A | 6/2002 |
| WO | WO 2005/059851 A | 6/2005 |

OTHER PUBLICATIONS

International Search Report for related patent PCT/US2007/084703 performed by International Searching Authority/EP on Jun. 26, 2008.
Written Opinion of International Searching Authority for related patent PCT/US2007/084703 performed by International Searching Authority/EP on Jun. 26, 2008.

* cited by examiner

*Primary Examiner* — Anthony Addy
*Assistant Examiner* — Edd Rianne Plata
(74) *Attorney, Agent, or Firm* — Mintz Levin Cohn Ferris Glovsky and Popeo, P.C.

(57) ABSTRACT

A mobile-to-mobile payment method and system are presented. One or more payor messages are received at a payment server from a mobile device associated with a payor. The one or more payor messages include an identifier of a payee and an amount. The identifier of the payee is associated with a payee account, and the mobile device is associated with a payer account. The payment server executes a transfer of funds of the amount from the payor account to the payee account.

18 Claims, 3 Drawing Sheets

MOBILE-TO-MOBILE PAYMENT SYSTEM AND METHOD

CROSS REFERENCE TO RELATED APPLICATION

The present patent application claims priority under 35 U.S.C. §119 to U.S. Provisional Patent Application Ser. No. 60/859,143, filed on Nov. 14, 2006, and entitled, "Mobile-to-Mobile Payment System and Method", the entire disclosure of which is incorporated by reference herein.

BACKGROUND

This disclosure relates generally to mobile computing applications, and more particularly to techniques for employing a credit device processor on a mobile device such as a cellular phone.

Currently, there is no credit device processor on a mobile device such as cellular phone. A credit device processor can process transactions using a credit device such as a credit card. Thus, many consumers are currently having to write a paper check, wire funds, or send payments for something via mail, which includes electronic mail as well as regular mail. Many, if not all, of these payment schemes include transaction fees.

What is needed is a cost-effective and convenient way for payments to be made from one mobile device to another, whether such mobile-to-mobile arrangement is a business-to-business (B2B), a business-to-consumer (B2C), or consumer-to-consumer (C2C).

SUMMARY

In general, this document discusses systems and methods for mobile-to-mobile payment. In some implementations, the term "mobile" can include a device such as a cellular phone or other wireless communication device.

The system and method facilitate mobile payment using the short messaging service (SMS) or text messaging application on a mobile device. In most implementations, a mobile payment method includes paying people for services, money owed, or anything related to the exchange of money or funds.

In one aspect, a mobile-to-mobile payment method includes a step of receiving at a payment server one or more payor messages from a mobile device associated with a payor, the one or more payor messages including an identifier of a payee and an amount. The method further includes the steps of associating the identifier of the payee with a payee account, associating the mobile device with a payor account, and the payment server executing a transfer of funds of the amount from the payor account to the payee account.

In another aspect, a mobile-to-mobile payment system includes a communications network having at least one wireless link to communicate with a plurality of mobile devices. The system further includes a payment server adapted to receive one or more payment messages from a payor's mobile devices, the one or more payor messages including an identifier of a payee and an amount. The payment server is further adapted to associate the identifier of the payee with a payee account, associate the payor's mobile device with a payor account, and execute a transfer of funds of the amount from the payor account to the payee account.

In yet another aspect, a mobile device includes a user interface for receiving instruction data for a mobile-to-mobile payment process, and a translator to translate the instruction data to one or more payment messages to control a payment server that executes the mobile-to-mobile payment process, the payment messages including an identifier of a payee and an amount of a payment. The mobile device further includes a messaging service adapted to transmit the payment messages to a payment server via a communications network having at least one wireless link.

In still another aspect, a mobile messaging service for a mobile device, includes an outbound messaging component for sending payment messages from the mobile device to a payment server, the payment messages including an identifier of a payee and an amount of a payment. The messaging service further includes an inbound messaging component for receiving confirmation messages from the payment server to the mobile device, the confirmation messages including prompts for further information and/or prompts for an acknowledgement to be sent on the outbound messaging component.

The advantages include lower risk of exposing financial information over wireless networks, quick and easy payment, no wire transfer fees, secure payment transfer of funds over the Internet and not wireless network. Other advantages include no need of credit card processor on cell phone, no credit card transaction fees, and no need for a user to write checks. Further, the system and method supports international transactions.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes systems and methods for mobile-to-mobile payment. The term "mobile" can include a device such as a cellular phone or other wireless communication device. The systems and methods facilitate payment from one party to another using the short messaging service (SMS) or text messaging application on a mobile device and via a communications network having at least one wireless link. In most implementations, a mobile payment method includes paying people for services, money owed, or anything related to the exchange of money or funds.

As an illustrative example, two people, Payor and Payee, have signed up ahead of time online through a website for a service for enabling mobile-to-mobile payments, but instead of making a payment from Payor to Payee through email, payment is actually made from an account associated with one mobile device to an account with another mobile device. The enabling mechanism is a messaging or text service operable by at least one, and preferably both, mobile devices. Each mobile device may be, without limitation, a cellular phone, a personal digital assistant, a handheld computer, or any other device that enables wireless data communication, and which includes an alphanumeric keypad by which a user can enter in alphanumeric codes and commands. Each person in the example can represent an individual or an entity, such as a business, group, or other such entity.

Figure 3:
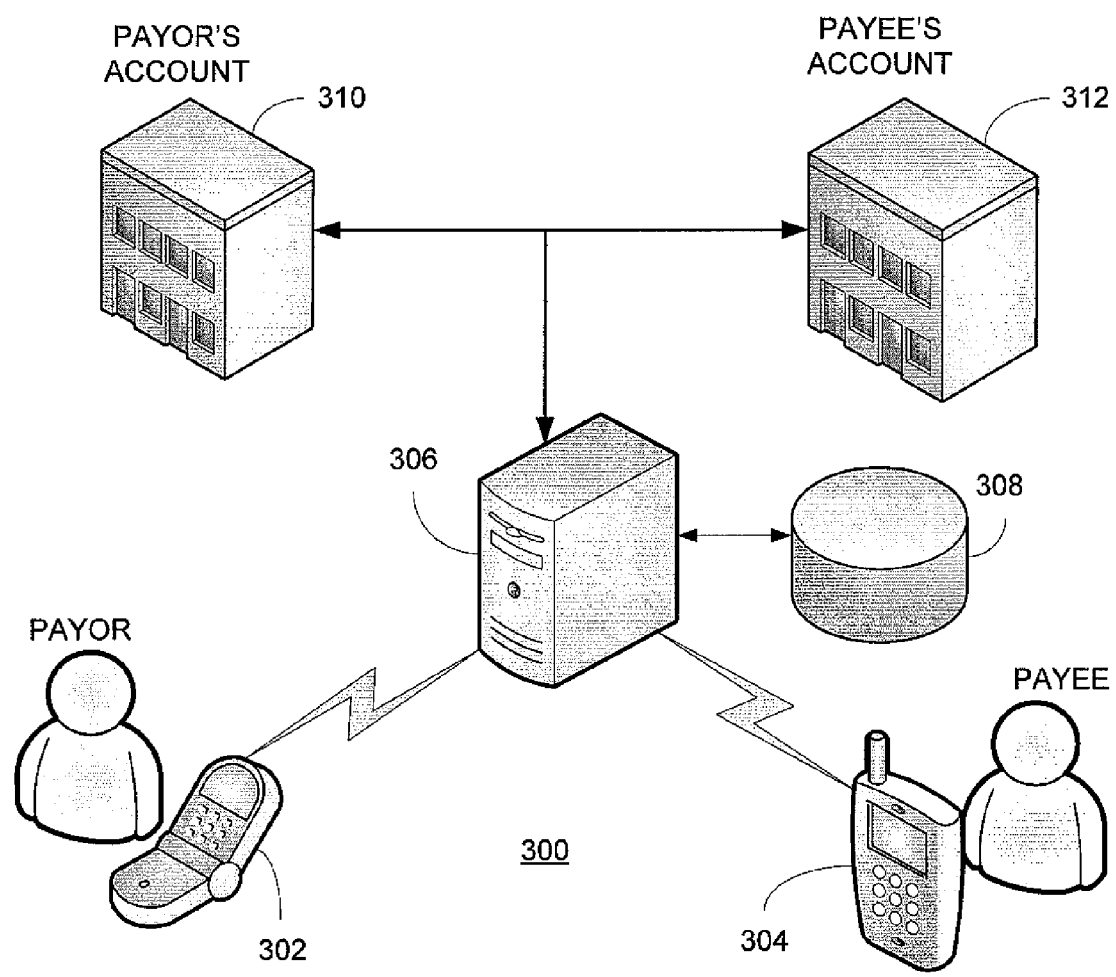
FIG. 3 illustrates a mobile-to-mobile payment system.

With reference to FIG. 3, the mobile-to-mobile payment system 300 enables a payment from a first mobile device 302 to a second mobile device 304. For sake of simplicity and for exemplary purposes only, the first mobile device 302 is associated with a payor, and the second mobile device 304 is associated with a payee. The first mobile device 302 interacts with a payment server 306 via a messaging service. The messaging service can be the Short Messaging Service (SMS) or other messaging application used by the first mobile device 302. The messages communicated to the payment server 306 from first mobile device 302 can include a payor ID (i.e. identifier such as mobile device ID or telephone number of the first mobile device 302), an identifier associated with payee (i.e. identifier such as mobile device ID or telephone number of the second mobile device 304, etc.), an amount to be paid, and request codes, confirmation codes, and other messages. For example, to access the payment server 306, payor can enter a random or predetermined alphanumeric code on the first mobile device 302 and transmit the code to the payment server to begin the payment process.

The payment server 306 can include a website that may include a mobile-formatted webpage through which users can interact via mobile devices. The payment server 306 includes a database, and is configured to receive messages from the mobile devices, identify and associate accounts with users, and automatically match received messages with users based either on a caller ID or embedded code within a message. The code may be the result of an interactive graphical user interface (GUI) provided by the website to the display screen of a mobile device. The GUI can have a number of graphical buttons, boxes or links, some of which are associated with or otherwise manipulated by activatable keys on a keypad or other physical controls of a mobile device.

The payment server 306 associates a payor with a payor account, receives an indication of the payee and payment amount from a mobile device associated with the payor, associates the payee, payor, and payment amount information with their respective embodiments as represented by data stored in the database 308, and at least partially interactively, via mobile devices 302 and 304, executes the payment transaction from the payor's account 310 to the payee's account 312.

Figure 1:
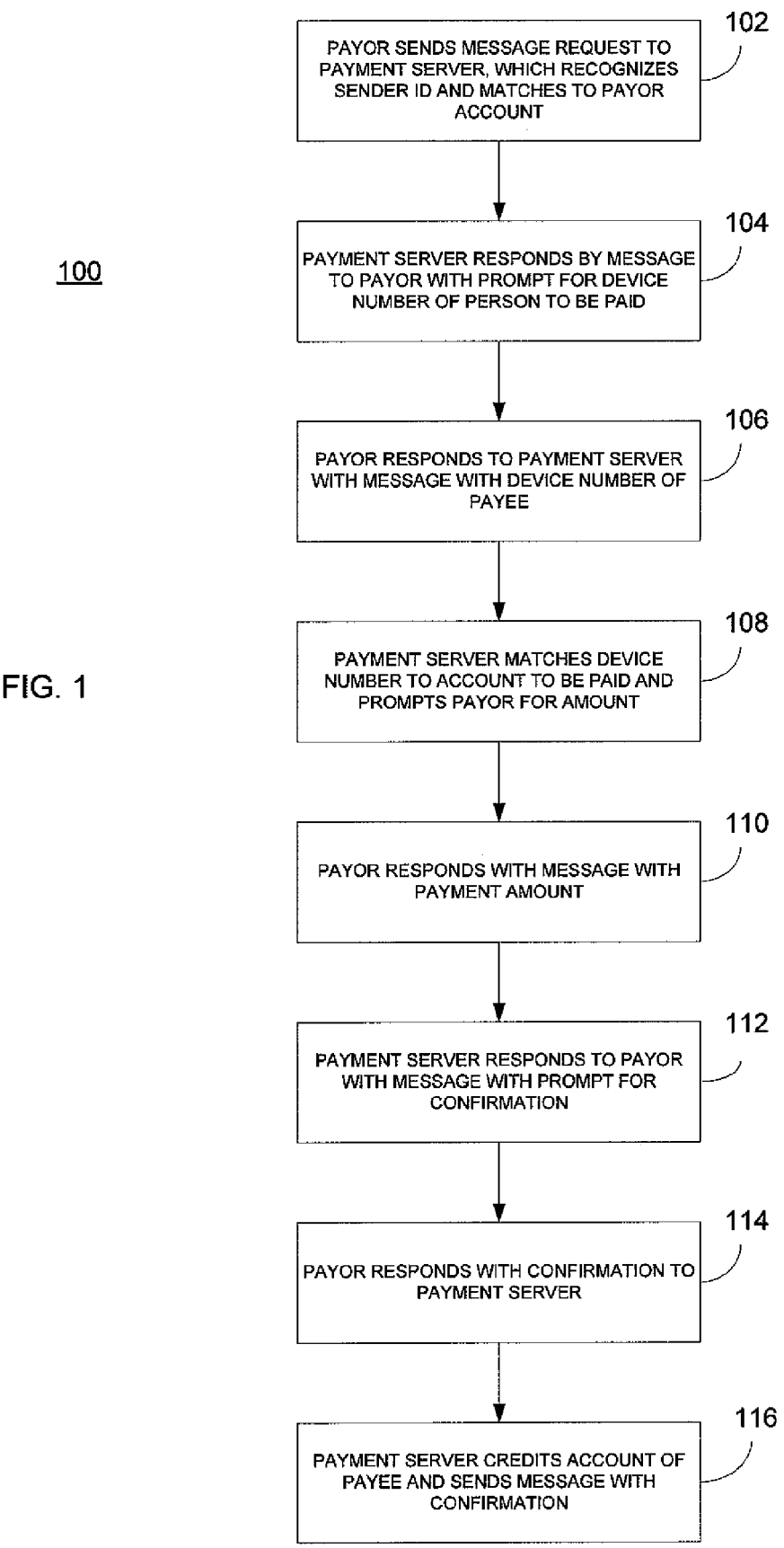
FIG. 1 illustrates one scenario of a mobile-to-mobile payment arrangement.

A first scenario 100 is illustrated in a flowchart shown in FIG. 1, and discussed in further detail below:

At 102, Payor sends, via text messages or other messaging service to Payee, a message including a code or a keyword such as "Pay to 10958." The code 10958 represents a short code which directs communication to a payment server that hosts a mobile-to-mobile payment website. The keyword is an identifier of the function, and as such the keyword can be any string of alphanumeric characters or symbols. Once Payor text messages "Pay to 10958," the payment server recognizes the requesting Payor through caller ID, and determines which account is to be debited, i.e. an account associated with Payor.

At 104, the payment server responds back to Payor, via SMS or other text messaging service, with a message including a prompt for Payor to enter a cell phone number or other identifying number associated with a mobile device of Payee, who Payor wants to pay. This and other messages from the payment server can be interpreted by a local application on a mobile device used by the payor to generate an interactive GUI, which translates messages into interactive components and user inputs into messages. In preferred implementations, at 106, Payor enters in his mobile device the Payee's cell phone number, or other identifier, and hits "send."

At 108, the payment server matches the Payee's cell phone number to an account to be paid, and generates response message to Payor prompting Payor to enter in the amount to pay Payee. At 110 Payor enters in an amount, such as "10.00," and hits "SEND." At 112, a message with prompt for a confirmation is sent to Payor or even Payee to indicates that Payor has paid Payee $10.00, and the payment is transferred to an account associated with Payee. In some implementations, the specific account can be identified by either Payee or Payor via text messaging of an account code. At 114, Payor responds with a confirmation to the payment server. At 116, the payment server causes the transfer of the payment from Payor's account to the Payee's account, and can send another confirmation message to either Payor and/or Payee.

Figure 2:
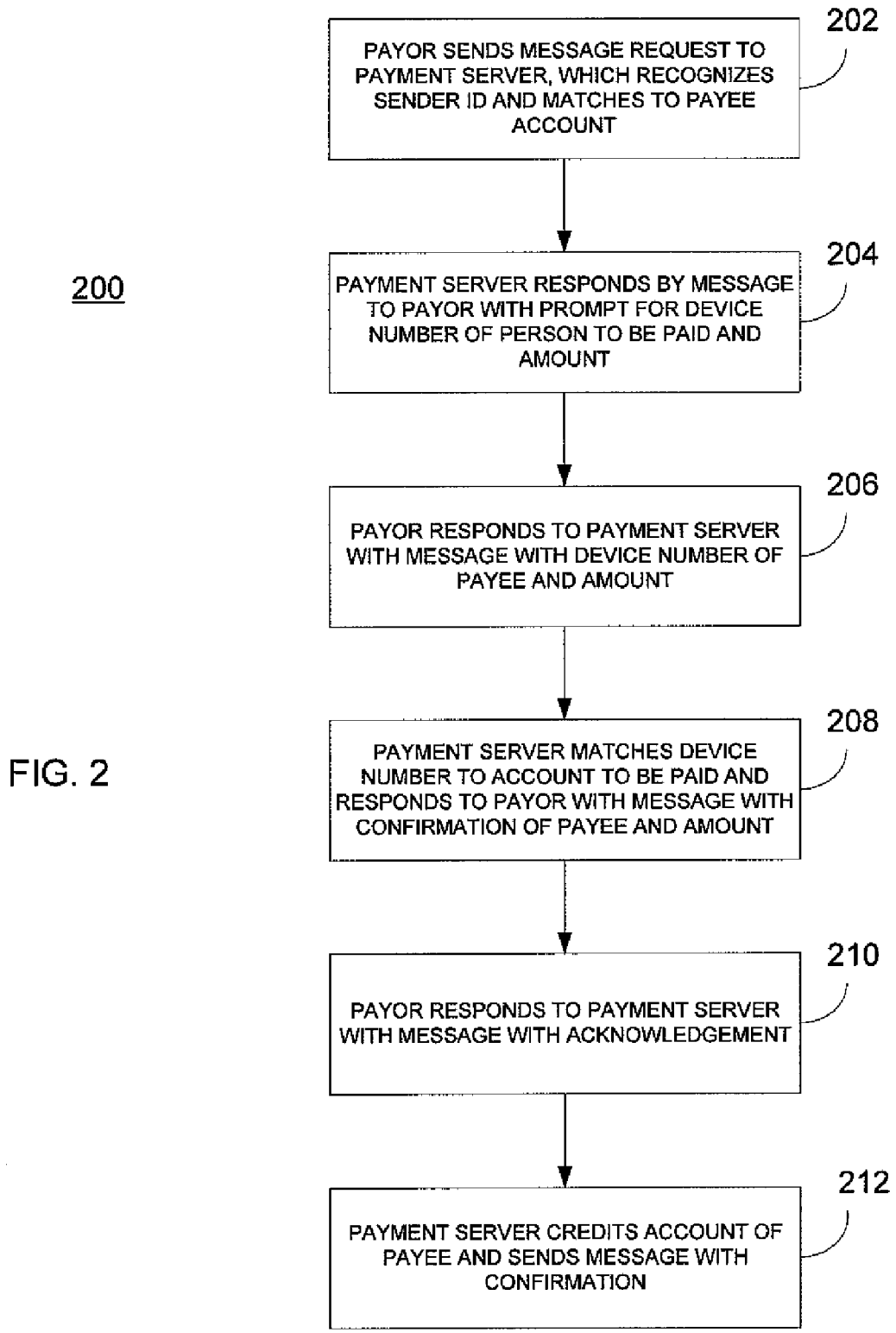
FIG. 2 illustrates another scenario of a mobile-to-mobile payment arrangement.

A second scenario 200 is shown in the flowchart of FIG. 2.

At 202 Payor text messages a keyword such as "Pay to 10958," which is a code that directs communication to a payment server. The short code can be anything that is issued by any of the wireless carriers or government agencies. Once Payor text messages "Pay to 10958," the payment server recognizes the requesting Payor through caller ID and knows which account is going to be debited. At 204, the payment server responds back to Payor via SMS or other messaging server, prompting Payor to enter in a Payee identifying number or code and an amount, which indicates that Payee is the person to be paid and how much should be paid, respectively.

At 206 Payor enters in the number of the person to pay, and the amount to pay, Payor hits "send" or a similar button or function of the mobile device. In one implementation, the format on a display appears as follows: "8586996163, 10.00". A response text message is returned to Payor confirming the phone number or name of person that Payor is about to pay, along with amount to be paid to Payee. At 208, the payment server associates the Payee's identifier with an account, and responds to payor with a message having a confirmation of the Payee and the amount.

At 210 Payor replies with an acknowledgement message, i.e. "yes" to confirm or "no" to cancel. If yes, then a confirmation text message to Payee gets sent that says Payor has paid $10.00 to Payee, and the funds are transferred from an account associated with Payor to an account associated with Payee. If no, then a text message is returned to Payor prompting for the cell phone number of Payee, the text message asking whether Payee is the person they want to pay and how much. At 212, the payment server credits an account of the Payee, via banking application connected with Payor's and Payee's account, and sends a message to either Payee and/or Payor with a confirmation of the completion of the transaction.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A mobile-to-mobile payment method comprising:

receiving at a payment server one or more payment messages from a mobile device associated with a payor, the one or more payment messages including a code for transmitting the one or more payment messages to the payment server;

sending a single prompt from the payment server to the mobile device associated with the payor to enter both an identifier of a mobile device associated with a payee and an amount to be paid to the payee;

receiving at the payment server from the mobile device associated with the payor a single message including both the identifier of the mobile device associated with the payee and the amount to be paid to the payee in response to the single prompt from the payment server;

in response to the single message received from the mobile device associated with the payor, sending a message from the payment server to the mobile device associated with the payor confirming the identifier of the mobile device associated with the payee and the amount to be paid to the payee;

receiving at the payment server from the mobile device associated with the payor an acknowledgement message confirming that funds should be transferred by the payment server from an account associated with the payor to an account associated with the payee;

associating the identifier of the mobile device associated with the payee with the account associated with the payee;

associating an identifier of the mobile device associated with the payor with the account associated with the payor; and initiating the transferring of funds of the amount to be paid to the payee from the account associated with the payor to the account associated with the payee.

2. The method of claim 1, further comprising the payment server generating a confirmation message indicating that the transferring of funds has been completed.

3. The method of claim 2, further comprising transmitting the confirmation message to the mobile device associated with the payor.

4. The method of claim 1, wherein the one or more payment messages are short messaging service messages.

5. The method of claim 1, wherein the one or more payment messages are generated by a client application on the mobile device associated with the payor.

6. The method of claim 1, wherein the identifier of the mobile device associated with the payee is a cell phone number of the mobile device.

7. A mobile-to-mobile payment system comprising:
a communications network having at least one wireless link to communicate with a plurality of mobile devices; and
a payment server adapted to:
receive one or more payment messages from a payor's mobile device, the one or more payment messages including a code for transmitting the one or more payment messages to the payment server;
send a single prompt to the payor's mobile device to enter an identifier of a mobile device associated with a payee and an amount to be paid to the payee;
receive a single message from the payor's mobile device including both the identifier of the mobile device associated with the payee and the amount to be paid to the payee;
in response to the single message from the payor's mobile device, send a message to the payor's mobile device confirming the identifier of the mobile device associated with the payee and the amount to be paid to the payee;
receive an acknowledgement message from the payor's mobile device confirming that funds should be transferred from an account associated with the payor to an account associated with the payee;
associate the identifier of the mobile device associated with the payee with an account associated with the payee;
associate the payor's mobile device with an account associated with the payor; and
initiate the transferring of funds of the amount to be paid to the payee from the account associated with the payor to the account associated with the payee.

8. The system of claim 7, wherein payment server is further adapted to generate a confirmation message indicating that the transferring of funds has been completed.

9. The system of claim 8, wherein the payment server is further adapted to transmit the confirmation message to the payor's mobile device.

10. The system of claim 7, wherein the one or more payment messages are short messaging service messages.

11. The system of claim 7, wherein the one or more payment messages are generated by a client application on the payor's mobile device.

12. The system of claim 7, wherein the identifier of the mobile device associated with the payee is a cell phone number of the mobile device.

13. A mobile device comprising:
a user interface for receiving instruction data or a mobile-to-mobile payment process;
a translator to translate the instruction data to one or more payment messages to control a payment server that executes the mobile-to-mobile payment process, wherein:
the payment messages include an identifier of a mobile device associated with a payee, an amount of a payment to be paid to the payee and a code for transmitting the one or more payment messages to the payment server, and
the mobile-to-mobile payment process includes:
sending a single prompt from the payment server to a mobile device associated with a payor to enter both the identifier of the mobile device associated with the payee and the amount to be paid to the payee;
receiving at the payment server from the mobile device associated with the payor a single message including both the identifier of the mobile device associated with the payee and the amount to be paid to the payee in response to the single prompt from the payment server;
in response to the single message received from the mobile device associated with the payor, sending a message from the payment server to the mobile device associated with the payor confirming the identifier of the mobile device associated with the payee and the amount to be paid to the payee;
receiving at the payment server from the mobile device associated with the payor an acknowledgement message confirming that funds should be transferred by the payment server from an account associated with the payor to an account associated with the payee;
associating the identifier of the mobile device associated with the payee with the account associated with the payee;
associating an identifier of the mobile device associated with the payor with the account associated with the payor; and
initiating the transferring of funds of the amount to be paid to the payee from the account associated with the payor to the account associated with the payee; and
a messaging service adapted to transmit the one or more payment messages to the payment server via a communications network having at least one wireless link.

14. The mobile device of claim 13, further comprising a display for displaying confirmation messages received from the payment server.

15. A mobile messaging service for enabling mobile-to-mobile payments, the service comprising:

a messaging component operating on a mobile device, wherein the messaging component:
  sends one or more payment messages to a payment server, the one or more payment messages including a code for transmitting the one or more payment messages to the payment server;
  receives a single prompt from the payment server to enter both an identifier of a mobile device associated with a payee and an amount to be paid to the payee;
  sends to the payment server a single message including both the identifier of the mobile device associated with the payee and the amount to be paid to the payee;
  in response to the single message sent to the payment server, receives a message from the payment server confirming the identifier of the mobile device associated with the payee and the amount to be paid to the payee;
  sends an acknowledgement message to the payment server confirming that funds should be transferred from an account associated with the payor to an account associated with the payee; and
  receives a confirmation message from the payment server indicating that the funds have been transferred from the account associated with the payor to the account associated with the payee.

16. The mobile messaging service of claim 15, wherein the messaging component includes a short messaging service.

17. The mobile messaging service of claim 15, further comprising a translation component for translating the single prompt, the message confirming the identifier of the mobile device associated with the payee and the amount to be paid to the payee, or the confirmation message indicating that the funds have been transferred from the account associated with the payor to the account associated with the payee from the payment server from text-based messages to graphical elements.

18. The mobile messaging service of claim 17, wherein the translation component is further adapted to translate the one or more payment messages into text-based messages.

* * * * *

UNITED STATES PATENT AND TRADEMARK OFFICE
CERTIFICATE OF CORRECTION

PATENT NO. : 8,369,828 B2
APPLICATION NO. : 11/940288
DATED : February 5, 2013
INVENTOR(S) : Mehrak Hamzeh Page 1 of 1

It is certified that error appears in the above-identified patent and that said Letters Patent is hereby corrected as shown below:

In the Claims:

Column 8, at line 16, "or", should read --for--

Signed and Sealed this
Fourteenth Day of May, 2013

Teresa Stanek Rea
*Acting Director of the United States Patent and Trademark Office*